Jan. 16, 1923.
J. B. HARLOW.
IMPULSE TRANSMITTING MECHANISM.
FILED JULY 14, 1917.
1,442,429.
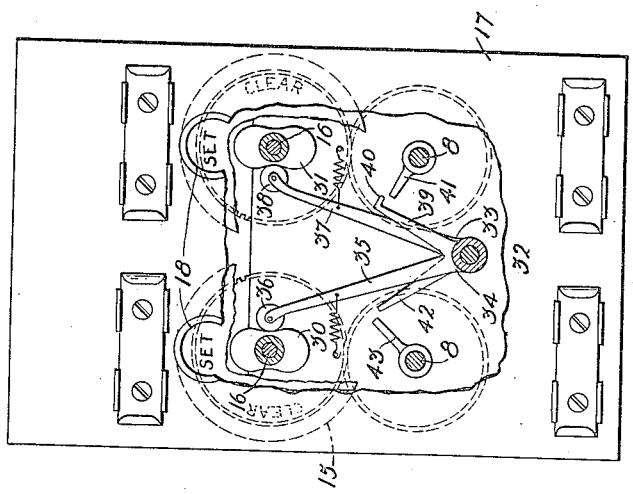
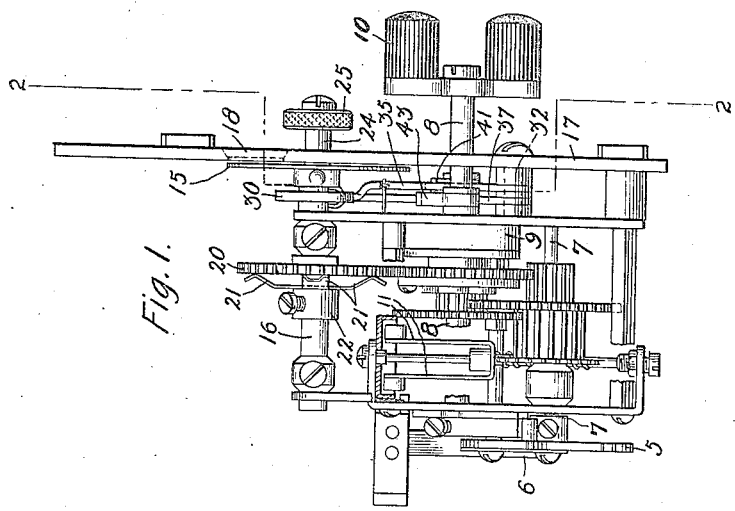
Inventor:
John B. Harlow.
by J. G. Roberts
Att'y.

Patented Jan. 16, 1923.

1,442,429

UNITED STATES PATENT OFFICE.

JOHN B. HARLOW, OF UPPER MONTCLAIR, NEW JERSEY, ASSIGNOR TO WESTERN ELECTRIC COMPANY, INCORPORATED, OF NEW YORK, N. Y., A CORPORATION OF NEW YORK.

IMPULSE-TRANSMITTING MECHANISM.

Application filed July 14, 1917. Serial No. 180,645.

*To all whom it may concern:*

Be it known that I, JOHN B. HARLOW, a citizen of the United States, residing at Upper Montclair, in the county of Essex and State of New Jersey, have invented certain new and useful Improvements in Impulse-Transmitting Mechanisms, of which the following is a full, clear, concise, and exact description.

This invention relates to impulse transmitting mechanisms for use in a signaling system in which selectively operated signals located at distant points from a main or sending station are controlled from said main or sending station to give directive indications.

The object of the invention in general is to provide impulse transmitting mechanism by means of which confusion or mistakes in the operation of the distant signals are rendered practically impossible.

In accordance with one feature of this invention, the transmitting mechanism is provided with an indicator which is operated upon each operation of the mechanism to indicate to the operator the condition of the distant signals. The indicating device may comprise a rotatable disk geared to the transmitting mechanism and adapted upon each operation of the transmitting mechanism to display a legend indicating the position of the distant signal with which the transmitting mechanism is associated.

In accordance with a second feature of this invention separately operated transmitting devices of the same mechanism are provided with an interlocking mechanism brought into operation upon the operation of one of the devices to prevent the operation of the other of the devices until a further operation of the first operated device is completed.

In the drawing Fig. 1 is a view in side elevation of a transmitting mechanism embodying the features of this invention; and Fig. 2 is a cross-sectional view taken upon line 2—2 of Fig. 1, and with a portion of the front plate broken away.

The mechanism of the impulse transmitting mechanism is the same in assembly and operation as that shown in the Brown Patent 1,155,640, issued October 5, 1915, and comprises in general a toothed contact controlling wheel 5, cooperating with a spring contact member 6. The toothed wheel 5 is carried by a shaft 7 geared to a main driving shaft 8, which is driven by a spring-motor 9 in response to the operation of a handle 10. A governor 11 controls the speed of rotation of the rotating mechanism.

An indicating disc 15 mounted upon a rotatable shaft 16 is located adjacent the rear face of a front plate 17 and is adapted in the rotation of said shaft 16 to make different indications before an opening 18 provided in the front plate 17. A gear wheel 20 mounted upon the shaft 16 is adapted to be turned through a quarter of a revolution upon each operation of the handle 10. The gear wheel 20 is frictionally secured to the shaft 16 to rotate therewith, through the agency of spring arms 21, 21 bearing upon one face thereof and carried by a hub 22 secured to the shaft 16. An end 24 of the shaft 16, which extends through the front plate 17 is provided with a thumb nut 25 by means of which the disc 15 may be adjusted to operate in synchronism with the rotating mechanism.

The interlocking feature of the mechanism is best shown in Fig. 2 in which a pair of transmitting devices is shown combined in one mechanism.

As shown in Fig. 2 there is mounted upon the shaft 16 of the transmitter at the left of the figure a cam disc 30 provided with oppositely located high portions separated by corresponding low portions. A cam disc 31 which is a duplicate of the disc 30 is mounted upon the shaft 16 of the transmitter at the right of Fig. 2. Pivotally supported at 32 are a pair of bell-crank levers 33 and 34. A long arm 35 on the bell-crank lever 34 carries at its end a roller 36 adapted to ride over the surface of the cam 30, and a corresponding arm 37 of the bell-crank lever 33 carries at its end a roller 38 adapted to ride over the surface of the cam 31. A shorter arm 39 on the bell-crank lever 34 is provided with a projection 40 adapted, when the roller 36 is standing on a high portion of the cam disc 30, to engage a finger 41 carried by the shaft 8 of the transmitter at the right of the figure to prevent the rotation of said shaft. An arm 42 of the bell-crank lever 33, is adapted when the roller 38 is resting on a high portion of the cam disc 31, to be moved into position to engage a finger 43 carried by the shaft 8 of the transmitter at the left of Fig. 2, thereby preventing the rotation of said shaft.

In the positions of the cams 30 and 31, where the rollers are resting in low portions thereof, either of the transmitters may be operated. When, however, one of them has been operated to turn the shaft 16 a quarter of a revolution, which brings a high portion of its cam under a roller of its corresponding bell-crank arm it will be impossible to operate the other of the transmitters until the one first operated has been operated a second time.

In the system of signals controlled by the transmitting mechanism of this invention the signals will stand normally in a set or stop position and will be moved to a clear or safety position by the despatcher operating one or the other of the transmitter devices. The provision of the interlocking mechanism prevents two signals of the same lock being simultaneously set to clear or safety position.

If for any reason a signal should fail to operate upon the first actuation of the transmitter associated therewith and operate upon the second actuation thereof, the indication on the key would be out of step with the signal. Since, however, the operator knows by the answer back received when the signal operates what indication is given he can make the correction necessary by turning the thumb nut 25.

What is claimed is:

1. In a device comprising a plurality of members rotatable in a single direction in fixed spaced relation to one another, and means operated by the rotation of each of said members to lock the other members against rotation.

2. In a device comprising a plurality of members in fixed spaced relation to one another and each rotatable in a single direction, a locking member, and shifting means operated by the rotation of each of said rotatable members to engage said locking member with the other rotatable members and hold them against rotation.

3. In an impulse transmitting mechanism, a pair of impulse transmitting wheels, a driving shaft for each of said wheels, an auxiliary shaft connected with each of said driving shafts, an indicator carried by said auxiliary shafts, and means operated by said auxiliary shafts for locking one or the other of said wheels against movement and for controlling said indicators.

4. In an impulse transmitting mechanism, a pair of impulse transmitting wheels, a driving shaft for each of said wheels, an auxiliary shaft connected with each of said driving shafts, an indicator carried by said auxiliary shafts, and means cooperating with said main and auxiliary shafts for selectively locking said impulse transmitting wheels against movement and for controlling the operation of said indicators.

5. In an impulse transmitting mechanism, a pair of impulse transmitting wheels, a main driving shaft for each of said wheels adapted when operated to drive said impulse transmitting wheel through a complete revolution, an auxiliary shaft connected with each of said driving shafts and adapted to be rotated a fraction of a revolution for each revolution of said main driving shaft, and means controlled by each of said auxiliary shafts in the operation thereof for determining the operation of the impulse transmitting wheel associated with the other of said auxiliary shafts.

6. In an impulse transmitting mechanism, a pair of impulse transmitting wheels, a main driving shaft for each of said wheels adapted when operated to drive said impulse transmitting wheels through a complete revolution, an auxiliary shaft connected with each of said driving shafts and adapted to be rotated a fraction of a revolution for each revolution of said main driving shaft, an indicator carried by each of said auxiliary shafts, and means cooperating with said main and auxiliary shafts for selectively locking said impulse transmitting wheels against movement and for controlling the operation of said indicators.

In witness whereof, I hereunto subscribe my name this 12th day of July A. D., 1917.

JOHN B. HARLOW.